United States Patent [19]

Gibbs et al.

[11] Patent Number: 5,729,451

[45] Date of Patent: Mar. 17, 1998

[54] APPARATUS AND METHOD FOR FUSING DIVERSE DATA

[75] Inventors: Bruce P. Gibbs, New Carrollton; David W. Porter, Annapolis; William E. Yancey, Columbia, all of Md.

[73] Assignee: Coleman Research Corporation, Orlando, Fla.

[21] Appl. No.: 566,353

[22] Filed: Dec. 1, 1995

[51] Int. Cl.[6] ........................................... G06F 17/17
[52] U.S. Cl. ............................................... 364/421
[58] Field of Search ................................. 395/420, 421, 395/422, 578

[56] References Cited

U.S. PATENT DOCUMENTS 5,321,613  6/1994  Porter et al. ....................... 364/420

OTHER PUBLICATIONS

"Data Fusion Modeling; Theory and Practice" Coleman Research Corporation, CMR/95–313, 45pp., No Date.
"An Iterative Approach to Solving the Hydrogeological Least Squares Problem" William E. Yancey, Sep. 11, 1995.
"LSQR: An Algorithm for Sparse Linear Equations and Sparse Least Squares" Christopher C. Paige, McGill University and Michael A. Saunders, Stanford University, ACM Transaction, Mar. 1982, pp. 43–71.
"Applied Groundwater Modeling Simulation of Flow and Advective Transport," Mary P. Anderson, University of Wisconsin, and William W. Woessner, University of Montana, 1992, pp. 214–257.
Spatial Continuity Development Notes, William E. Yancey, Coleman Aug. 16, 1994, pp. 1–129.

Primary Examiner—Donald E. McElheny, Jr.
Attorney, Agent, or Firm—Millen, White, Zelano, & Branigan, P.C.

[57] ABSTRACT

A data fusion workstation apparatus and method utilizes algorithms and can be used for applications such as, e.g., hydrogeological modeling, steady-state hydrological flow modeling, transport uncertainty determination, flow/transport fusion, oil reserve management, water supply development, geo-technical engineering projects, and management decision optimization. The invention uses a spatial continuity model which is extended to 3D and equations are provided for computation of the spatial AR coefficients from a desired covariance function. The data fusion workstation provides more robust optimization iterations by use of an algorithm that includes Trust Region or Step Halving methods to limit the Gauss Newton step in solving non-linear least squares problems. Measurement biases and error parameters, and parameters which define a hydrological flow model can be included in the common set of estimated states. An LSQR or other iterative algorithm is used to reduce the computation time for each step of a nonlinear optimization, thereby allowing computation of problems having a very large number of states. The invention preferably provides transport uncertainty calculations in a fusion post-processing step. The invention allows contaminant measurements to be used with hydraulic head and conductivity measurements for better calibration of flow and transport models.

7 Claims, 9 Drawing Sheets

Microfiche Appendix Included
(13 Microfiche, 1232 Pages)

FIG. I

| states | ... | $x_{i-1}$ | $x_i$ | $x_{i+1}$ | $x_{i+2}$ | ... | $x_n$ | $C$ | $z$ |
|---|---|---|---|---|---|---|---|---|---|
| $x_{i-1}$ | ... | X | X | X | 0 | ... | 0 | X | X |
| $x_i$ | ... | 0 | X | X | 0 | ... | 0 | X | X |
| $x_{i+1}$ | ... | 0 | 0 | X | 0 | ... | 0 | X | X |
| $x_{i+2}$ | ... | 0 | 0 | 0 | 0 | ... | 0 | 0 | 0 |
| . | ... | . | . | . | . | ... | . | . | . |
| . | ... | . | . | . | . | ... | . | . | . |
| . | ... | . | . | . | . | ... | . | . | . |
| $x_n$ | ... | 0 | 0 | 0 | 0 | ... | 0 | 0 | 0 |
| $C$ | ... | 0 | 0 | 0 | 0 | ... | 0 | X | X |

FIG. 2

| $x_{i-1}$ | $x_i$ | $x_{i+1}$ | $C$ | $z$ |
|---|---|---|---|---|
| $D_1$ | $D_2$ | $D_3$ | $D_4$ | $D_5$ |
| 0 | $D_6$ | $D_7$ | $D_8$ | $D_9$ |
| 0 | 0 | $D_{10}$ | $D_{11}$ | $D_{12}$ |
| 0 | 0 | 0 | $D_{13}$ | $D_{14}$ |

FIG. 3

APPARATUS AND METHOD FOR FUSING DIVERSE DATA

BACKGROUND OF THE INVENTION

The invention relates in general to the field of site modeling, and in particular to an improved data fusion workstation for combining diverse data to create a fused set of data which is used to produce an image representative of the physical characteristics of a site over space and time.

The present invention relates to U.S. Pat. No. 5,321,613 to Porter et al., the entire disclosure of which is incorporated herein by reference. Porter et al. disclose a Data Fusion Workstation which provides an apparatus and method for mathematically combining information from different sensors with physical and statistical information to develop a fused picture of a site, and which also computes the uncertainty on model parameters defining that site picture. The invention of Porter et al. has been used to model site stratigraphy using geophysical data.

However, the invention disclosed by Porter et al. in U.S. Pat. No. 5,321,613 has several limitations. Specifically, that invention is limited by practical considerations to two-dimensional layered-earth modeling. And, the prior art data fusion workstation does not provide for computing bias parameters of physical or measurement models. Further, the Data Fusion Workstation of the prior art included optimization procedures which were not robust and which used computationally-demanding and storage-demanding algorithms for solving the nonlinear least squares problem. These and other limitations are discussed below in further detail.

Measurements (z) input to the Data Fusion Workstation of the prior art are assumed to be a function of earth model parameters (x) to be estimated and random measurement noise (r):

$$z = h(x) + r$$

Those earth model parameters (x) are assumed to vary spatially within the earth, and the statistical characteristics of that variation are assumed to be defined by a spatial covariance function (or equivalently a variogram) which is assumed to be generated by an autoregressive (AR) model:

$$v_{ij} = \sum_{k,l} a_{k,l} v_{i+k,j+l} + w_{ij}$$

The limited spatial extent of the AR and measurement models results in limited bandwidth of the square-root information or SRIF matrix: the rapid execution speed and reasonable storage requirements of the resulting algorithm are a direct result of the finite bandwidth of the SRIF matrix.

FIGS. 1 and 4 of U.S. Pat. No. 5,321,613 to Porter et al. show the earth consisting of layers. Most measurement forward models for time or frequency domain electromagnetic (TDEM or FDEM), direct current resistivity, and seismic refraction or reflection assume a layered earth. That is, at a given horizontal position, the parameters of the earth (which are input to the measurement forward model) are assumed to be constant vertically within each of several layers. Thus, the estimated parameters in a state vector x may consist of layer widths or depths, layer resistivity for EM or resistivity models, and layer velocity (compression of shear) for seismic measurements. While it is possible to use 3-dimensional forward models for these measurements, practical computational problems usually limit modeling to layered-earth representations. Since parameters in different layers are assumed to be independent, the spatial continuity AR models for parameters in each layer are also 2-dimensional. Even for measurement types which can be modeled as three-dimensional, the required relationships for 3D spatial continuity modeling had not been derived in the prior art. Thus, the two-dimensional nature of these models prevents the Data Fusion Workstation of the prior art from being capable of modeling plumes or performing three-dimensional hydrological modeling.

The model for each parameter (e.g. width, resistivity, velocity, etc.) within a layer is:

$$x_{ij} = s_{ij}(C) + v_{ij}$$

where $s_{ij}(C)$ is the large-scale trend or mean defined by a few coefficients C, and $v_{ij}$ is the small-scale random variation defined statistically by the AR model. $s_{ij}(C)$ could be a 2D or 3D spatial polynomial model, or other low-order representations could also be used (e.g. Fourier, splines). The coefficients represented by C can be estimated in the fusion simultaneously with all other unknowns. We refer herein to the elements of C as "common parameters" and they are located at the bottom of the state vector (x) for convenience and efficiency.

In implementing the algorithm, it is advantageous to use the whole value $(s_{ij}(C) + v_{ij})$ as the parameter estimated in x. Thus, the measurements are a function of only the whole value, while the pseudo-measurements are a function of the difference between the whole value and the computed trend value at each location $(s_{ij}(C))$.

It is convenient to define the earth model in terms of a grid of nodes arranged (approximately) horizontally on the earth's surface, and vertically within layers. Such a definition is illustrated in FIG. 1. Although the number of rows and columns at any horizontal location could be variable, it is convenient and efficient to use a fixed number of rows and columns. Different levels of model detail within regions can be accommodated using variable grid spacings. Since the number of earth layers is usually much smaller than the number of horizontal grid rows or columns, maximum efficiency is obtained by ordering the parameters within x so that the layer number is incremented more rapidly than the row or column number, i.e., if i denotes the column number, j the row number, k the layer number and w=layer width and r=layer resistivity, the states at grid column i and row j would be ordered:

$$x^T = (\ldots, w_{ij1}, r_{ij1}, w_{ij2}, r_{ij2}, w_{ij3}, r_{ij3}, \ldots)$$

Grouping of w and r, rather than alternating, could also be done. For simplicity in the discussion to follow, we will assume that the row index is incremented next and the column index is incremented least rapidly.

While data obtained directly from measurements within wells (e.g. layer depths, hydraulic head) are essentially point measurements, other geophysical measurements involve an average of earth characteristics both vertically and horizontally. For example, the TDEM current pulse generated by a horizontal loop on the earth's surface will propagate downward (with time) through the earth approximately as an expanding ring. The most commonly used forward model for a TDEM measurement assumes that the earth resistivity is constant within each layer, even though this is not strictly true. Since the fusion model defines parameters only at node locations, interpolation must be used to compute the values at the centroid of the measurement. It is assumed that these interpolated values apply for the full lateral extent of the measurement within each layer. Modeling error will result if earth spatial continuity is smaller than the physical extent of the measurement.

To compute the parameter values input to the forward model, the Data Fusion Workstation uses 2-dimensional linear interpolation based on the parameters at the four horizontal nodes surrounding each measurement location. Alternatively, other 2-dimensional interpolating methods can be used (e.g. inverse distance weighing, inverse distance squared weighting, splines, etc.), and 3-dimensional interpolation can be used if the parameters are not layered. Note that the interpolating formula must be used to compute both the expected value of the measurement and the measurement partial derivatives required in SRIF updating. The product rule for derivatives is used to obtain the required partials with respect to nodal states. The partials of the measurements with respect to the parameters at the measurement location are obtained by numerically differencing the forward model, except for very simple measurement models.

With this interpolation procedure, each point measurement is a function only of the nodal states immediately surrounding the measurement location. Thus the "bandwidth" (b) of each point measurement is equal to the number of states in two grid columns, e.g., if there are 2 earth parameters at each node, three layers, and 12 rows, the maximum non-zero extent of the partial derivatives for a given measurement is (2×12×3+1)×2=146 states. If the spatial AR model for the parameters is limited to a first-order autoregression (including only nodes immediately adjacent to each node), the bandwidth of the pseudo-measurements will be equal to the number of states in three grid columns (e.g. (3×12×3+1)×2=218 in the above example).

Use of a first-order AR model gives an approximately exponential autocorrelation function, which has been found to be satisfactory for most applications. As shown in U.S. Pat. No. 5,321,613 to Porter et al., if both measurements and pseudo-measurements are processed simultaneously for all measurements in a grid column, and the processing sequentially sweeps through the grid columns, the bandwidth of the square-root information array will be limited to the number of states in three grid columns plus the number of common parameters. Specifically, the SRIF array storage when processing grid column i is shown in the table of FIG. 2.

In the table of FIG. 2, $x_i$ is used here to denote all grid states associated with column i (i.e., $x_{i,j,k,l}$ for all valid j, k and l), C are the common parameters, z is the right-hand side and X denotes a non-zero sub-array. Thus, the only sub-arrays that need be stored when processing this grid column are those which are shown in the table of FIG. 3.

In the table of FIG. 3, sub-arrays $D_1$, $D_2$, $D_3$, $D_6$, $D_7$, and $D_{10}$ are all dimension $n_g \times n_g$ where $n_g$ is the number of states included in one grid column ($n_g$=rows×layers×parameters per node). Note that arrays $D_1$, $D_6$, $D_{10}$ and $D_{13}$ will always be upper triangular while $D_3$ will be almost lower triangular. Sub-arrays $D_4$, $D_8$ and $D_{11}$ will be $n_g \times n_c$ where $n_c$ is the number of common parameters. $D_{13}$ will be $n_c \times n_c$. Finally, $D_5$, $D_9$, and $D_{12}$ will be $n_g \times 1$.

FIG. 4 shows a flow chart illustrating SRIF processing steps. With the above-described arrays (minus zero sub-blocks) stored in the computer's random access memory (RAM), all pseudo-measurements involving grid column i and all point measurements located between the nodes of grid column i and i+1 are processed. Very few elements of the D sub-arrays are zero, except for the structural zeroes noted above. Thus, it would be difficult to find alternate implementations that would reduce storage below that shown. After processing all grid column i measurements, the sub-arrays $D_1$, $D_2$, $D_3$, $D_4$, and $D_5$ will never be modified when later measurements are processed. Thus, they are saved on disk, the next two $n_g$ rows of sub-arrays are shifted up, the third $n_g$ rows of the array are set to zero, and all columns (except z) are shifted left. This can be seen in FIG. 4. The processing then proceeds to the next grid column and this procedure repeats. After processing the last grid column, prior information (if any) on the common parameters is processed as pseudo-measurements and $D_{13}$ and $D_{14}$ are saved on disk.

It is thus seen that the computer RAM storage requirements are $(3n_g + n_c)(3n_g + n_c + 3)/2$ floating point words (usually 8 bytes). The disk storage requirements are $n_{col} n_g (3n_g + n_c + 1) + n_c(n_c + 1)$ words, where $n_{col}$ is the number of grid columns. The arrays can be stored on disk in single precision with little effect on the results. These storage requirements can be accommodated on most workstations and PCs for problems up to 30000 states.

When computing the Gauss-Newton update of the state estimate using either the Square Root Information Smoother (SRIS) or backsolving, the required array storage is very similar to that required for the SRIF. The primary difference is that the lower triangular partition of the information array will be non-zero during intermediate steps of the SRIS. Thus the required RAM storage of the SRIS is twice that of the SRIF.

The above discussion assumes that the grid nodes are all arranged on a regular grid of a fixed number of columns, rows and layers. While this is not a requirement, it greatly simplifies implementation of the algorithm and reduces the number of computations.

The above-described method works if the measurements and pseudo-measurements are a function only of the states immediately surrounding a given node. This is also true for most other types of pseudo-measurements on a regular grid (e.g. hydrological flow). Unfortunately, the rule is broken when processing measurements with separate source and receivers, such as seismic refraction. In this case, efficiency is maximized if the grid is arranged so that a single measurement path crosses the fewest number of grid columns as possible. The maximum bandwidth is equal to the number of states in the number of grid columns crossed plus 2.

The invention of U.S. Pat. No. 5,321,613 to Porter et al. used the SRIF algorithm for computing the Gauss-Newton step at each optimization iteration. While this is the most accurate approach, it is very computationally demanding and storage-demanding as the number of states is increased for detailed site models. Since the optimization algorithm often requires 10 or more iterations before converging, the Data Fusion Workstation method becomes unattractive if the computer execution time per iteration is several hours.

AREA OF APPLICATION

Data fusion workstations of the prior art have been applied to site characterization directed toward remediation status determination and/or control programs for hazardous waste, pollution, etc. This frequently involves calculation of contaminant pathways to the environment. Since those pathways are usually through groundwater, hydrological modeling can be a critical element of site characterization.

Conventional hydrogeological modeling is based on finite-difference or finite-element flow software where parameters of the model are defined in regions. These parameters may include hydraulic conductivities, anisotropy, boundary conditions, recharge/drain conductance, source heads, pumping flows, etc. Data available for calibrating the model consists primarily of measured hydraulic heads, but may include some measurements of conductivity. The calibration procedure is a very time consuming trial-and-error process where these parameters are varied to produce the best fit to the head measurements. Calibration continues until the analyst exhausts the available money, time or patience.

Freeze, R. A., Massman, J., Smith, L., Sperling, T. and B. James ("Hydrogeological Decision Analysis: 1. A Framework", Ground Water, September-October 1990) present a decision analysis methodology for engineering projects involving hydrogeology. They state that the hydraulic conductivity must be viewed as a spatial stochastic process in order to account for natural heterogeneity. Freeze, et al. claim that a limitation of current methods is the lack of a practical approach for inverse modeling using a spatial stochastic process. In their judgment, substantial information is often lost by the inability to systematically combine information from hydraulic head and conductivity data.

Other researchers have attempted to implement inverse hydrological modeling methods which minimize the measurement residuals by adjusting model parameters (e.g., Anderson, Mary, and Woessner, William, "Applied Groundwater Modeling Simulation of Flow and Advective Transport", Academic Press, 1992, pages 214–257, which is incorporated herein by reference). The number of estimated conductivities is often small (e.g. specified in zones), so the results have not been very satisfactory because either the heterogeneity was not properly represented, or the problem formulation resulted in poor observability or non-unique solutions. In more recent approaches, the conductivity has been represented as a spatial stochastic process, but the methods used to solve the problem were not practical because of very large storage and/or computational requirements (see McLaughlin, D., "Recent Developments in Hydrologic Data Assimilation", U.S. Report to the IUGG, June 1994).

Quantification of transport uncertainty has been recognized in the literature (e.g. Freeze, et al.) as an important component in remediation decision making, and methods for stochastic simulation have been presented. Uncertainty in transport leads to risk of compliance failure that must be weighed against economic costs and benefits. However, previous approaches do not account for information on the conductivity random field provided by indirect data, such as hydraulic head.

It has been suggested that the transport uncertainty computation be extended to directly include the contaminant concentration measurements as additional information for calibrating the flow model, since the concentration is a strong function of flow. However, this is difficult to implement optimally because time integration of the contaminant transport results in cross-coupling between the contaminant concentration at each point and all the nodal heads, conductivities and concentrations at other locations; that is, the bandwidth of the measurement is equal to the full size of the state vector!. Thus, the storage requirements are prohibitive when using the SRIF for a problem with a few thousand nodes.

Some authors (e.g., Keidser and Rosbjerg, "A Comparison of Four Approaches to Groundwater Flow and Transport Parameter Identification", Water Resources Research, Vol 27, September 1991) have suggested using a sub-optimal two-stage approach for implementing full flow/transport fusion. In the first stage, log transmissivities are estimated from head and concentration data, given initial source concentration and dispersivity. In the second stage, source concentration and dispersivities are estimated using concentration data. However, the method is undesireable in that it is limited to low-order models of conductivity which cannot account for the random heterogeneous nature of the conductivity.

SUMMARY OF THE INVENTION

In a preferred embodiment, the invention provides a data fusion workstation apparatus and method which utilizes improved algorithms and can be used for applications such as, e.g., hydrogeological modeling, steady-state hydrological flow modeling, transport uncertainty determination, flow/transport fusion, oil reserve management, water supply development, geo-technical engineering projects, and management decision optimization. The spatial continuity model is extended to three dimensions and equations are provided for computation of the spatial AR coefficients from a desired covariance function. The data fusion workstation provides more robust optimization iterations by use of an algorithm that includes Trust Region or Step Halving methods to limit the Gauss Newton step in solving non-linear least squares problems. Measurement biases and error parameters, and parameters which define a hydrological flow model, can be included in the common set of estimated states. An LSQR or other iterative algorithm is used to reduce the computation time for each step of a nonlinear optimization, thereby allowing computation of problems having a very large number of states. The invention preferably provides transport uncertainty calculations in a fusion post-processing step. The invention allows contaminant measurements to be used with hydraulic head and conductivity measurements for better calibration of flow and transport models.

BRIEF DESCRIPTION OF THE DRAWINGS

The foregoing and other objects, features, and advantages of the invention will be apparent from the following more particular description of preferred embodiments as illustrated in the accompanying drawings, in which reference characters refer to the same parts throughout the various views. The drawings are not necessarily to scale, emphasis instead being placed upon illustrating principles of the invention.

FIG. 2 shows a table illustrating SRIF array storage when processing a grid column i.

FIG. 3 shows a table illustrating the sub-arrays that need be stored when processing the grid column i.

DETAILED DESCRIPTION

Figure 1:
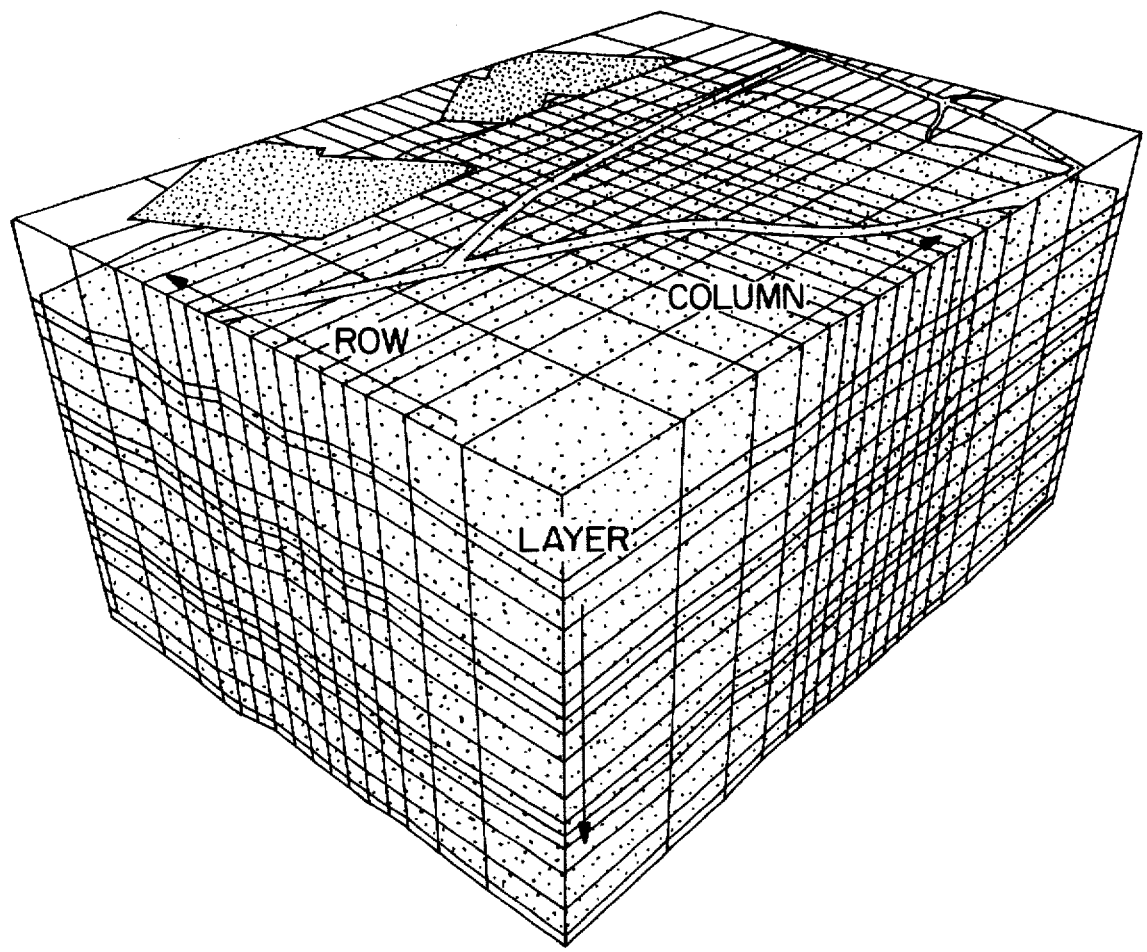
FIG. 1 shows a diagramatic perspective view illustrating a three-dimensional fusion grid.
Figure 4:
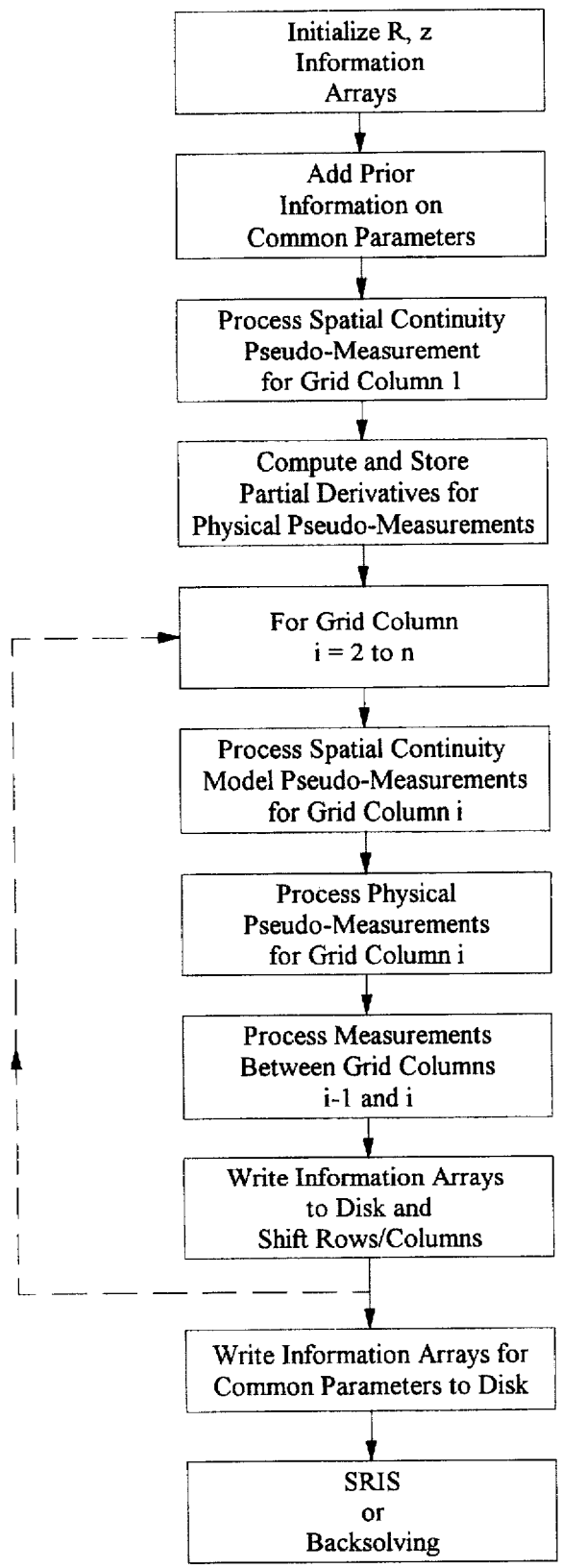
FIG. 4 shows a flow chart illustrating SRIF processing steps.
Figure 5:
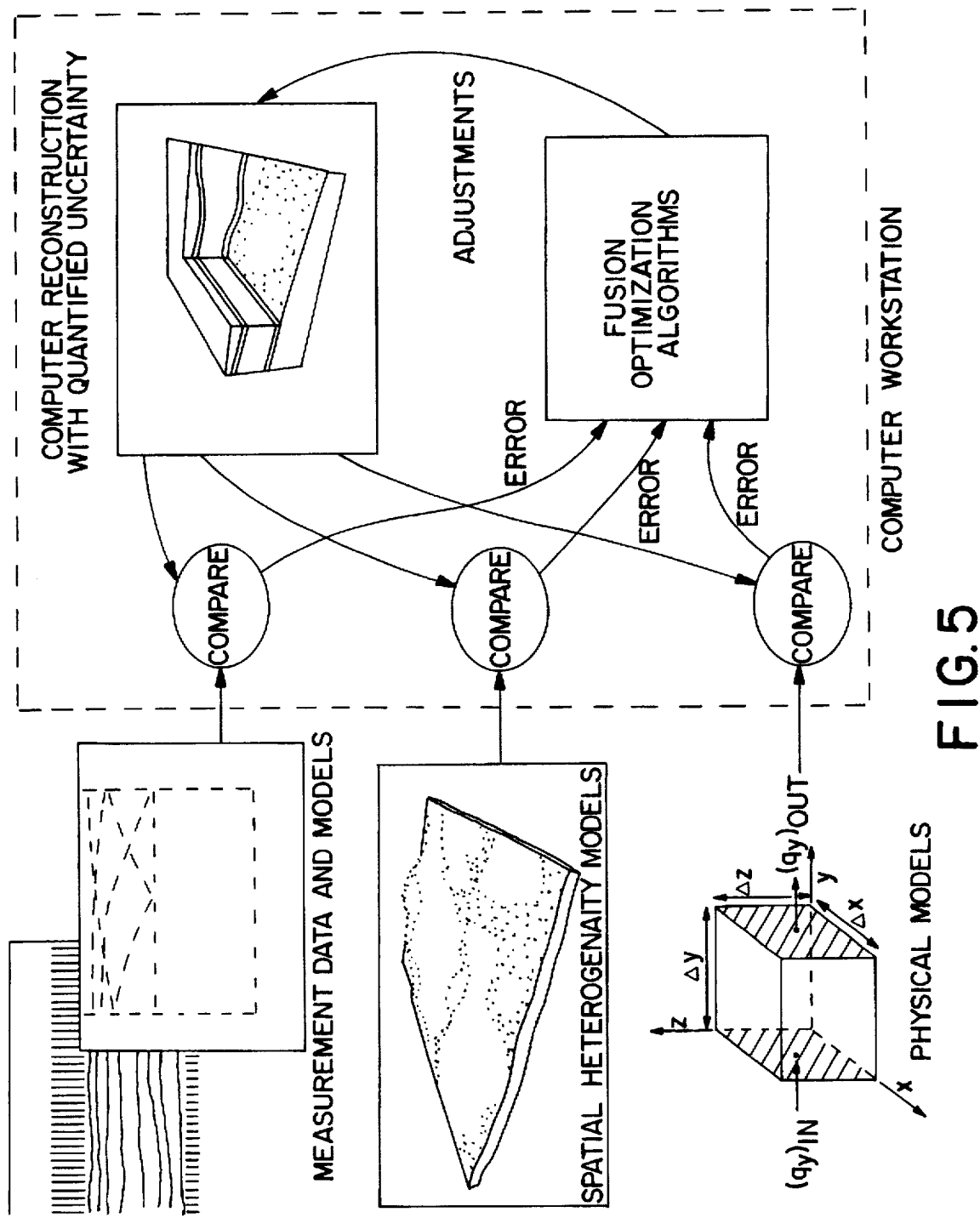
FIG. 5 shows a flow diagram illustrating certain principles of Data Fusion Modeling.

FIG. 5 illustrates the broad concepts of data fusion modeling. Measurement data, spatial continuity constraints, and physical law constraints are compared with the outputs of the site model at each iteration. These differences (errors) are used to update the model and the iterations continue until the errors are acceptably small.

OPTIMIZATION

The generic problem addressed by the Data Fusion Workstation is called nonlinear least squares and involves finding the value of a state vector $\hat{x}$ which minimizes a quadratic cost function of the form:

$$J = \sum_i [z_i - h_i(\hat{x})]^T \Gamma^{-1}[z_i - h_i(\hat{x})] +$$

$$\sum_i [0 - a_i(\hat{x})]^T W^{-1}[0 - a_i(\hat{x})] + \sum_i (\bar{x} - \hat{x})^T P_0^{-1}(\bar{x} - x)$$

The first term in J is the contribution of the measurement residuals, the second is pseudo-measurements (either spatial continuity or physical models) and the last is prior information on common parameters.

Solution of nonlinear least squares problems usually involves repeated application of the Gauss-Newton method for computing the state correction at each iteration:

$$\hat{x}_i = \hat{x}_{i-1} + (H^T \Gamma^{-1} H + A^T W^{-1} A + P_0^{-1})^{-1} \{H^T \Gamma^{-1}[z_i - h_i(\hat{x})] + A^T W^{-1}[0 - a_i(\hat{x})] + P_0^{-1}(\bar{x}_i - \hat{x})\}$$

Unfortunately, because of the nonlinearities, full Gauss-Newton steps often result in an increase in the least squares cost function. Thus, methods must be employed to limit the step. The two approaches used in the Data Fusion Workstation of the invention include trust-region and step-halving methods.

In the step-halving method, the cost function J is evaluated at the new $\hat{x}$ computed by the Gauss-Newton method. Since it is only necessary to compute residuals and not partial derivatives, the computational burden is orders of magnitude smaller than when the SRIF is used. If this new $J_i$ is smaller than $J_{i-1}$ from the previous iteration, the step is accepted and computation of the next Gauss-Newton iteration begins. However, if $J_i$ is greater than $J_{i-}$, the Gauss-Newton step is halved and J re-evaluated. If the new $J_i$ is smaller than $J_{i-1}$, the step is accepted; otherwise the step is again halved. This process can be repeated several times if necessary, but it is usually limited to about 8 step-halvings before terminating the process and declaring failure. Fortunately, this seldom occurs.

This basic step-halving logic is relatively simple to implement and works well for most problems. It also has the advantage that simple backsolving of Dx=z (where D is upper triangular) can be used to compute the step, rather than using the SRIS (which requires orders of magnitude more computations). One extension of the method which is often useful is to allow for physical constraints on states. For example, layer widths and resistivities should be constrained to be greater or equal to zero. Inclusion of constraints results in a quadratic programming problem, which can be difficult to solve if the solution bounces from one constraint surface to another. The method used for computing the constrained minimum is documented in "Data Fusion Theory and Practice", CMR/95-313, September, 1995. The difference between the constrained minimum and the current state is used as the nominal step in the step-halving logic. This logic must be modified slightly because the constrained step can change after halving a step. It is difficult to prove that the resulting algorithm will always find an optimal solution, but it has worked well in practice.

Figure 6:
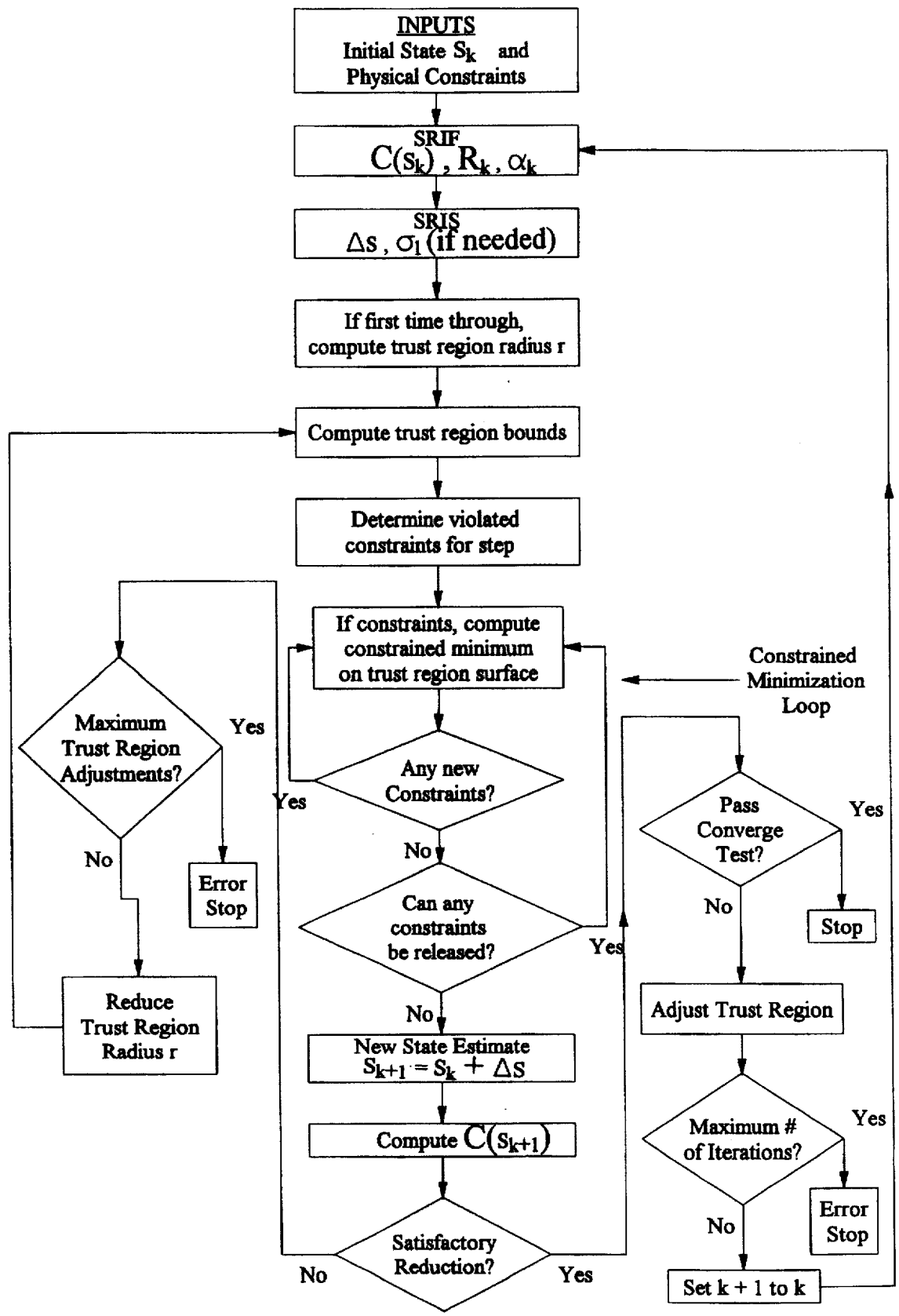
FIG. 6 shows a flow chart illustrating a Trust Region algorithm.

FIG. 6 illustrates a trust region algorithm, which is a more-robust method for solving the nonlinear least squares problem. The trust region algorithm differs from the step-halving method in that the nominal step at each iteration is not necessarily the Gauss-Newton step. Rather, a region about the current estimate $\hat{x}_{i-1}$ in which linearity can be "trusted" is defined, and the step is constrained to lie within that trusted region. In the trust region algorithm, the trust region is defined as upper and lower limits on each state so that the nominal step is computed using the quadratic programming algorithm described previously. This is the primary disadvantage of the method in that the quadratic programming solution requires many passes of back-solving which involves reading the entire square-root information matrix stored on disk. Because half of the states may be limited on a given iteration, the algorithm can stall by "thrashing" on the disk.

The size of the trust region is adjusted on each iteration based on how accurately the quadratic model was able to predict the change in the cost function for the given step. Nominally, the trust region for each state is defined as a factor times the computed estimate standard deviation, i.e. for state $x_i$, the trusted region is $\hat{x}_i \pm r \sqrt{P_{ii}}$ where r is the scale factor and $P_{ii}$ is the error variance computed from the inverse of the information matrix. If the quadratic model is able to accurately predict the change in J for the given step, r is increased on the next iteration. If the computed step does not decrease J, r is reduced until the step improves J. Again, this is often limited to about eight reductions. Note that $P_{ii}$ must be computed on each iteration, so that the SRIS must be used, and this requires much more computation than back-solving. Hence, step-halving is much preferred to the trust region method in most cases. Further details of the trust region algorithm may be found in "Data Fusion Theory and Practice", CMR/95-313, September 1995.

ITERATIVE LINEAR LEAST SQUARES SOLVERS

The Data Fusion Workstation of the invention according to a preferred embodiment uses an iterative linear least squares solver algorithm as a faster alternative to the SRIF for computing the Gauss-Newton step. Specifically, the LSQR algorithm is preferably used. The LSQR and its alternatives have been described by Paige, C. C., and Saunders, M. A., "LSQR: An Algorithm for Sparse Linear Equations and Sparse Least Squares", ACM Transactions on Mathematical Software 8, 1 (March 1992), which is incorporated herein by reference.

Unlike the SRIF algorithm used in the prior art, the LSQR algorithm does not transform the measurement and pseudo-measurement equations into equivalent information arrays. Rather, the LSQR solves the linearized least-squares problem using a conjugate-gradient algorithm based on the Lanczos bi-diagonalization approach. While the SRIF does many computations to transform the problem into one which can be solved in one-step (backsolving), LSQR works directly with the original measurement equations but iterates many times until the residuals are acceptably small. Since individual measurements and pseudo-measurements are functions of very few states (typically less than 40), LSQR has the advantage of very small storage requirements and potentially much fewer computations than the SRIF. Whether the computation time is reduced depends upon the number of LSQR iterations required for convergence. The algorithm should theoretically converge exactly when the number of iterations equals the number of unknown states, but this may not happen because of numerical errors. The maximum number of allowable iterations should be set to n/2 for well-conditioned problems and 4n for less well-conditioned ones. The approximately $n^2$ increase in computations for LSQR can be much less than the SRIF when the number of states is greater than several thousand. Thus LSQR is preferred for large problems, although it may not converge in every case.

The LSQR method can also compute the estimate error standard deviations $\sqrt{P_{ii}}$ but it does not directly compute the off-diagonal elements of the covariance matrix (This could be added but the number of computations would greatly increase). Thus LSQR could not be used with the trust-region algorithm or with step-halving using constraints. The primary function of LSQR is to reach a converged solution faster and with less storage than the SRIF. If the estimate error covariance matrix is required, one final iteration of the SRIF must be used.

Other alternatives to the LSQR method are iterative preconditioned conjugate gradient (PCG) algorithms using the conventional least-squares "normal equations". The full information matrix formed in the normal equations preserves most of the sparsity present in the original measurement equations, and thus the storage requirements are minimal. Unfortunately, most preconditioned conjugate gradient software (used to solve finite-difference and finite-element problems) does not work well with the normal equations for the problems addressed by the Data Fusion Workstation. Another alternative is to treat the pseudo-measurement component of the normal equations as a preconditioner for the measurements. This can be solved using a PGC solver while the pseudo-measurement component is solved using iterative solvers such as ORTHOMIN. This is documented in Yancey, "An Iterative Approach to Solving the Hydrological Least Squares Problem," September 1995, the entire disclosure of which is incorporated herein by reference.

Further details of the algorithms (such as data editing and validating) may be found in "Data Fusion Modeling Theory and Practice", CMR/95-313, November 1995, the entire disclosure of which is incorporated herein by reference.

3D Spatial Continuity Model

The generic form of the spatial continuity AR model used in the Data Fusion Workstation is:

$$v_{ij} = \sum_{k,l} a_{k,l} v_{i+k,j+l} + w_{ij}$$

Figure 7:
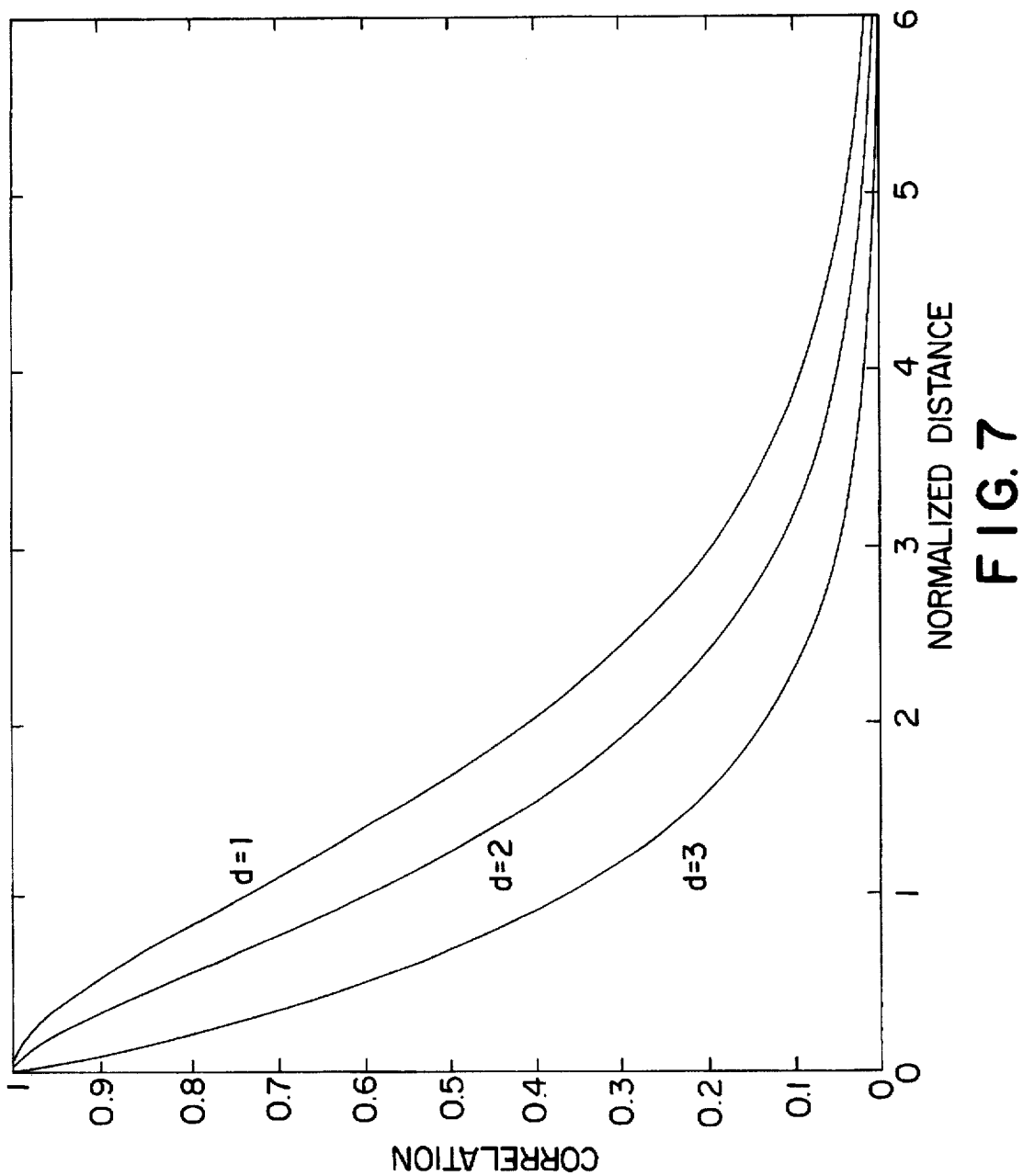
FIG. 7 shows a plot illustrating continuous autocorrelation functions in one, two, and three dimensions.

To use this model, the a coefficients and $W=E(ww^T)$ must be computed for a specified autocorrelation function or variogram. If it is assumed that the underlying process is a continuous first-order stochastic process in one, two or three dimensions, it is possible to compute the auto- and cross-covariance functions for uniform but possibly anisotropic grids spacings and correlation distances. For a 3-dimensional isotropic process, the continuous covariance function is $$E\{[v(x_1,y_1,z_1) - \bar{v}(x_1,y_1,z_1)][v(x_2,y_2,z_2) - \bar{v}(x_2,y_2,z_2)]\} = \sigma^2 e^{-\sqrt{(x_1-x_2)^2+(y_1-y_2)^2+(z_1-z_2)^2}/\tau}$$

where the mean value $\bar{v}$ is obtained from the polynomial model described previously. This covariance function versus distance is plotted in FIG. 7 for one, two and three dimensional AR models. It will be noted that the 3D model is exactly exponential but the 1D and 2D models deviate from exponential near zero distance. However, it is sufficiently accurate to assume an exponential relation and simply specify the distance $\tau$ at which the correlation falls to $1/e=0.37$.

The user will usually want to specify $\sigma$ and $\tau$ in each direction for a particular model parameter and have the Data Fusion Workstation compute the a and W parameters for a given grid spacing, which can vary throughout the grid. These relationships are quite complicated but have been derived and documented in Yancey, W. E., "A Random Field Model for Spatial Continuity", CMR/95-320, Aug. 16, 1994, the entire disclosure of which is hereby incorporated by reference.

NEW APPLICATIONS

Hydrogeological Modeling

The Data Fusion Workstation capability to automatically estimate the best values of hydrological parameters (allowing for model heterogeneities) can allow a hydrologist to obtain better results in a shorter period of time, thus reducing costs. It can also allow the hydrologist to think about the problem at a higher conceptual level, thus enabling development of a better model. Use of the Data Fusion Workstation allows computation of an inverse hydrological solution using the spatial stochastic process random field model, without the requirement for a supercomputer.

The fundamental equation defining saturated hydrological flow is Darcy's law:

$$V = -K\nabla h$$

where V is water velocity, K is the hydraulic conductivity tensor, and h is hydraulic head. Using this relation, the equation for the net mass flow to a unit volume is derived as:

$$q + S\frac{\partial h}{\partial t} = \nabla(K\nabla h)$$

where q is volumetric flux per unit volume, S is specific storage and t is time. This equation applies for saturated flow but the equation for variably-saturated flow is similar. It can also be implemented for 2D, 2.5D or 3D flow models.

Although it is theoretically possible to use the above equation to perform data fusion for non-steady flow, practical problems make this very difficult to implement. (The bandwidth of the information matrix grows with time requiring storage far beyond the capabilities of most computers). Fortunately, most site characterization problems are very nearly steady-state so that the steady-state approximation can be used:

$$\nabla(K\nabla h) = q$$

When applied to a grid of nodes in a finite-element or finite-difference structure, the resulting equations are of the form:

$$f(h, K, \theta) = 0$$

where the vector $f$ represents the net flow errors for all the nodes, h is the corresponding heads, K is the hydraulic conductivity coefficients at the nodes, and $\theta$ is a set of parameters used to define the flow model. $\theta$ may consist of boundary condition parameters, recharge coefficients, leakage coefficients, source/drain coefficients, source/drain flows, anisotropy, etc. K may be defined as horizontal conductivity or it may be desirable to specify conductivity for each direction. Note that the K coefficients are allowed to be different at each node, since heterogeneity is considered to be one of the dominant errors in conventional groundwater modeling.

The above equation represents a physical constraint on the hydrological model that we wish to include when estimating values for hydrological heads, conductivities and other model parameters. Thus, this equation will be processed as a pseudo-measurement in the Data Fusion Workstation, where h, ln(K) and θ are included in the state vector x to be estimated. (Other model parameters not estimated are ignored in this discussion). ln(K) is used as a state, rather than K, since K can varies by 13 orders of magnitude and the distribution of measured conductivities in a region has been found to be approximately log normal. While ln(K) is treated as a nodal state like any other spatially varying parameter, θ is included in the common parameters located at the bottom of the state vector. Since the Data Fusion Workstation must process all measurements and pseudo-measurements as random variables with some error, it is necessary to specify the nominal accuracy of the flow equation. This $\sigma_f$ is used as the pseudo-measurement weighting.

In order to use the flow error as a pseudo-measurement, it is necessary to compute the partial derivatives of $f$ with respect to the unknown parameters. Since most flow modeling software is complex, calculation of analytic partials would be very difficult. Rather, numerical partials with central differences are used. Use of numerical partials gives great flexibility to the Data Fusion Workstation since almost any parameter used in the flow model can be easily estimated. Also, many different modeling codes (such as the widely-used MODFLOW software developed by McDonald and Harbough of the U.S. Geological Survey) can be incorporated in the Data Fusion Workstation since the only interface between data fusion and the model, other than the input parameters, is the computed steady-state flow error at each node.

To summarize, the linearized pseudo-measurement error model for the flow equation is:

$$0 = f(\hat{h}, ln(\hat{K}), \hat{\theta}) + \frac{\partial f}{\partial h}(h - \hat{h}) + \frac{\partial f}{\partial lnK}(lnK - ln\hat{K}) + \frac{\partial f}{\partial \theta}(\theta - \hat{\theta}) + \epsilon$$

where $\hat{h}$, $ln(\hat{K})$ and $\hat{\theta}$ are estimates at the current iteration and h, ln(K) and θ are the true values to be determined, and $\epsilon$ is the model error.

In addition to the equation for the flow error, another constraint is spatial continuity (heterogeneity) on hydraulic conductivity. ln(K) is treated as a parameter in the spatial continuity AR pseudo-measurement model discussed previously. In most cases this would be applied to only horizontal conductivity with horizontal and vertical anisotropy fixed. In implementing the pseudo-measurement processing, it is most efficient to alternate the flow equation and spatial continuity at each node.

When using a 3d model, both the trend polynomial and random field for ln(K) are specified as 3d within each hydrostratigraphic layer. Different hydrostratigraphic layers are assumed to be independent so that spatial continuity is not used vertically across the boundary between layers. Each hydrostratigraphic layer usually includes several grid layers so that the flow and spatial continuity can be modeled as 3d. The exceptions are thin clay layers of 2.5D flow models, which use a single nodal layer.

In performing hydrological modeling at specific sites, it is necessary to specify different parameter values (e.g., recharge, leakage) in different regions, and to allow for different methods of specifying vertical conductivity. The DFW implementation allows full flexibility to fix or estimate parameter values in different regions. It also allows vertical conductivity to be specified directly within zones, or it can be computed using log anisotropy, which is modeled as a 3d polynomial within each lithological layer. Any of these coefficients can be estimated in the DFW.

The data available for hydrological modeling consists primarily of hydraulic heads in wells, and conductivities derived from slug and pumping tests. Head measurements are obtained by lowering an electrical tape into the well, and measuring the depth at which standing water causes current to flow in the tape. This depth is differenced from the surveyed well casing elevation to obtain the water elevation. In slug tests, a known volume of water is extracted or injected in the well, and the time required for the water level to return to normal is measured. Hydraulic conductivity is derived from this time. Puming tests are similar in that the lowering of the water level for a given pumping rate allows computation of conductivity. Flow measurements derived from calibrated heat loss can also be used, but they are less reliable. Since the heads and log conductivities are states in the model, the measurement partial derivatives are ones and zeroes, with interpolation used to obtain partials with respect to the nodal states. Other data used for the geological data fusion (required to establish lithology for the hydrostratigraphic units) includes depths to lithological layers, particularly clay. Again, this is differenced from the well casing elevation to obtain layer elevation.

In implementing the above equations, it is necessary to order and save calculation results so that computations and storage are minimized. This is particularly true because of the numerical partial derivative calculations. If properly implemented, this should be a small part of the total computation.

Figure 10:
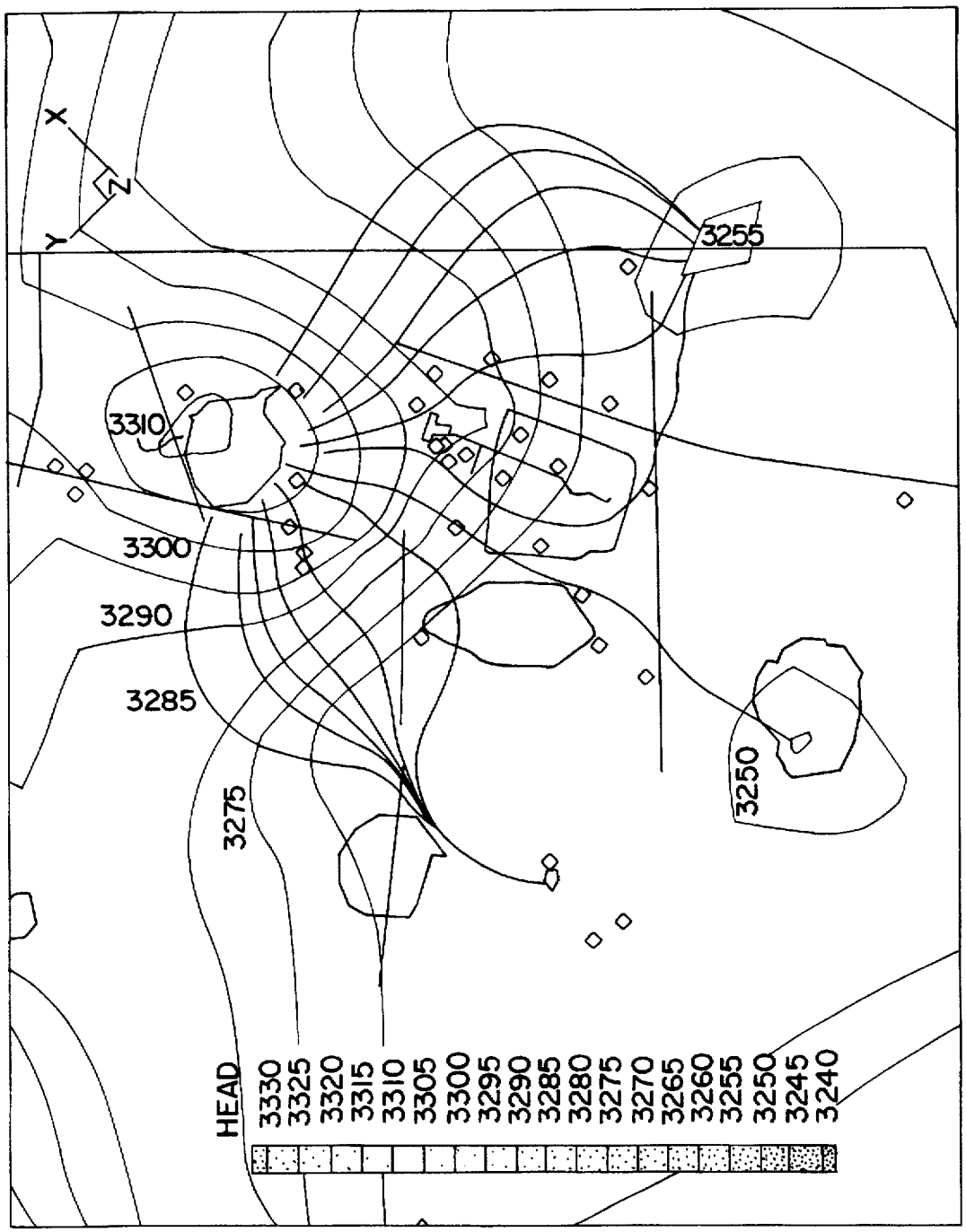
FIG. 10 shows a site map illustrating the results of using the data fusion workstation of the invention.

FIG. 10 shows a site map illustrating the results of using the data fusion workstation of the invention. The map of FIG. 10 was produced by hydrological modeling for a perched aquifer where recharge to and leakage from local regions was estimated. Contours of constant hydraulic head and flow pathlines are shown.

Transport Uncertainty

Decisions regarding site remediation are usually based on the risk to humans associated with exposure to various contaminants. Since these exposure levels must be projected many years in the future, the uncertainty of the projections can be great. The range of variation in the estimated exposure levels may affect decisions of how to remediate or whether to remediate at all. The largest contribution to the uncertainty in these projections is due to errors in the estimated groundwater flow and uncertainty in contaminate source levels and profiles. Use of the Data Fusion Workstation for hydrological modeling can quantify the uncertainty on the groundwater flow and thus quantify uncertainty on the contaminant concentrations. By quantifying the uncertainty, remediation decisions can be more conservative and thus less costly, in some cases.

As set forth in the Background section above, previous approaches to quantification of transport uncertainty do not account for information on the conductivity random field provided by indirect data, such as hydraulic head. This information is preferably included in the Data Fusion Workstation of the invention.

Transport of contaminants in groundwater is often modeled using the advective-dispersive relation:

$$\partial c \partial t = \nabla^T (c\bar{V} - D\nabla c) - \frac{c_{i/o} q}{\epsilon}$$

where c is concentration, $\bar{V} = V/\epsilon$ is average linear velocity, D is the diffusivity tensor, q is volume rate of flow into the system, $c_{i/o}$ is contaminant concentration in that flow, and $\epsilon$ is porosity. Numerical codes which integrate this equation use combinations of implicit and explicit methods because the integration is marginally stable. Other effects that may be included are retardation and decay.

The integrated concentration is a direct function of water velocity, which is a function of hydraulic conductivities and heads, which are states in the data fusion flow model. Thus the error covariance matrix for head and conductivity can be used to compute the flow contribution to the contaminant concentration error.

Error bounds for a nonlinear system can be computed using linearized covariance analysis or Monte-Carlo simulation. Covariance analysis usually involves less computation, but may be inaccurate because of system nonlinearities. When applied to transport modeling, the covariance approach has the disadvantage of very large storage requirements, and the savings in computations may not be realized.

Figure 8:
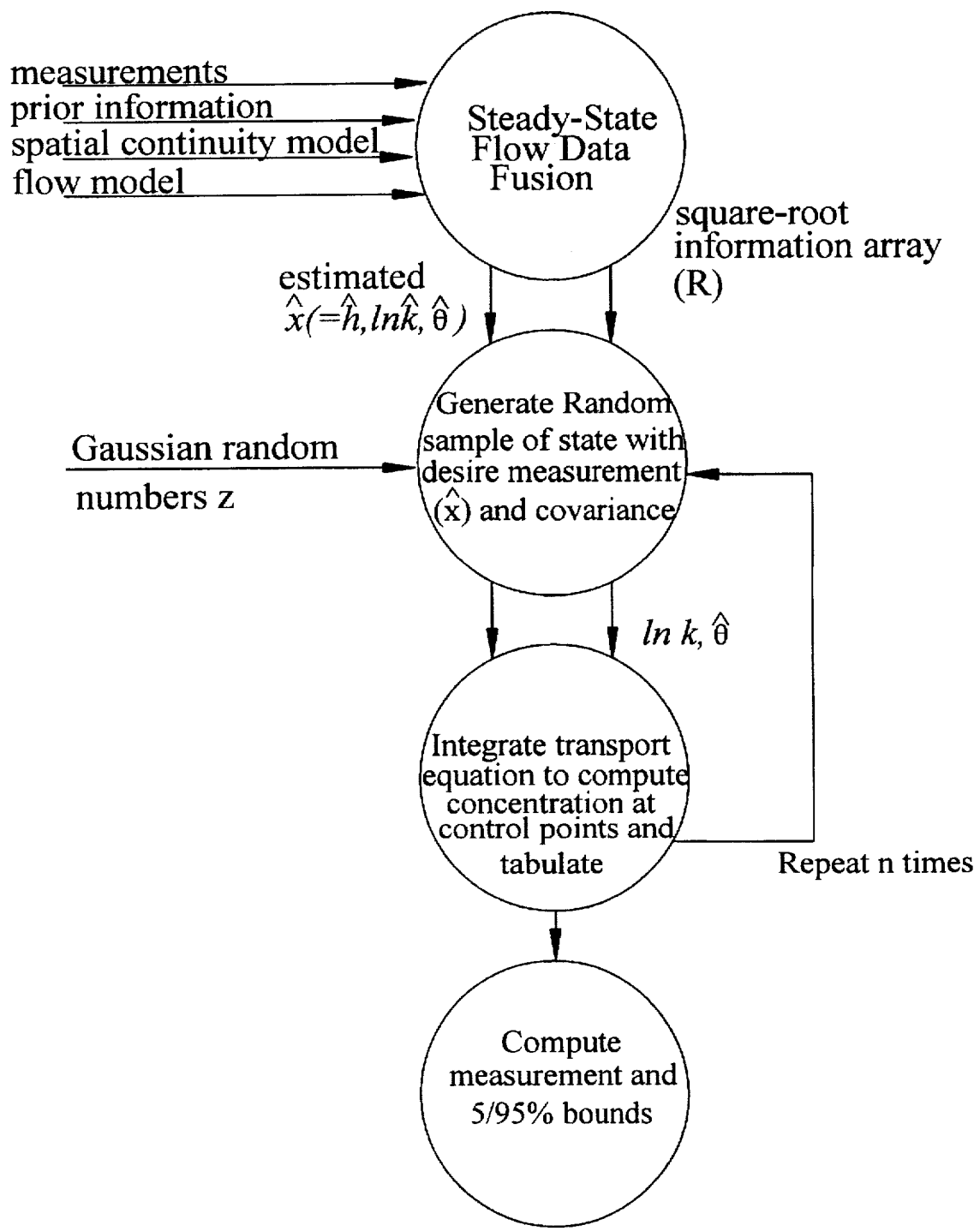
FIG. 8 shows a flow chart illustrating an algorithm for determining transport uncertainty using a Monte Carlo simulation.

Because of those limitations, a modified Monte Carlo approach is implemented in the Data Fusion Workstation of the invention. FIG. 8 illustrates an algorithm for implementing such an approach. The individual steps are performed as follows.

The hydrological data fusion (first block) will compute the square-root information matrix for the estimated steady-state heads and lnK. Because of the large number of states, it is not practical to directly form the state error covariance matrix. It is relatively easy, however, to generate Monte Carlo samples of flow h and lnK which have the desired mean ($\hat{h}$,ln$\hat{K}$) and covariance (second block). This is done using $$x_i = \hat{x} + \Delta x_i$$

where $\Delta x_i$ is computed for each sample by backsolving $R\Delta x_i = z_i$, R is the square root information matrix generated in the flow fusion, and $z_i$ is a vector of zero-mean, unit variance samples generated by a Gaussian random number generator. The samples of head and lnK (and possibly other $\theta$ parameters) in $x_i$ can be input to a transport simulation (third block) to compute samples of concentration at specific points in time and space. The distribution of these samples can be tabulated to compute confidence bounds (e.g. 5% and 95%) on the concentration (fourth block). The effect of source terms errors can also be included in the Monte Carlo simulation by simply adding random error samples.

In practice, it may be more accurate to re-compute the steady-state hydraulic heads using the given lnK samples because even small errors in mass balance can cause large errors in integrated concentration. The re-computed steady-state heads will not be identical to the sampled heads, but the difference should be small compared to the estimation error.

Flow/Transport Fusion

As is set forth in the Background section above, it is also possible to extend the transport uncertainty computation to directly include the contaminant concentration measurements as additional information for calibrating the flow model, since the concentration is a strong function of flow. However, this is difficult to implement optimally the bandwidth of the measurement is equal to the full size of the state vector, and this results in prohibitive storage requirements. Use of the LSQR algorithm does not solve the problem because the computational burden is excessive. And, two-stage approaches (in which log transmissivities are estimated in a first stage using initial source concentration and dispersivity, and source concentration and dispersivities are estimated in a second stage using concentration data) are limited to low-order models of conductivity which cannot account for the random heterogeneous nature of the conductivity.

A more-optimal approach can be implemented using the Data Fusion Workstation of the invention. Here, the flow and transport models use a fine numerical grid, but log conductivity is modeled as a random field on a much coarser grid. If the number of nodes in the conductivity model is less than one thousand, it is practical to accumulate the full information matrix which includes all cross information. Rather than model the steady-state flow and transport equations as pseudo-measurements, they are directly used as constraints to obtain the partial derivatives of measured heads and concentrations with respect to conductivities, recharge, leakage, source terms, dispersivities, etc. The required flow partials can be calculated using a combination of numerical differencing and back-solving of the transformed flow equation. However, calculation of transport partials will be prohibitive for many large problems. Thus, it may be desireable to compute the gradient of the cost function using adjoint methods, and use a variable metric method (e.g., BFGS) for optimization.

The spatial continuity model for log conductivity can be applied as a pseudo-measurement as described for flow fusion, but a better interpolation method (e.g. splines) will be needed to obtain values for the fine grid. Prior information on other model parameters can also be included. Thus head, conductivity and concentration data can be directly used to estimate all the parameters associated with the flow and transport models. The primary limitation of the approach is the estimation of conductivities on a coarse grid, but this should not be a bad approximation since the number of wells available for modeling will generally be much less than the number of estimated conductivities.

Oil Reservoir Management

Data Fusion Modeling can be used to aid decision making for oil reservoir management. Current management is based on petrophysical properties obtained from drilling programs and is limited in the use of data sets and in the quantification of uncertainty. In current methods, geophysical data are used to guide the drilling and to establish continuity between drill holes. Then data from the drill holes are statistically interpolated to determine petrophysical properties using kriging methods that also quantify uncertainty in the properties. Geostatistical simulations are run for different recovery and enhanced recovery methods to determine the statistical odds of profitable oil recovery. If the simulations do not agree with reservoir measurements taken from test wells, then some subjective attempt is made to adjust the petrophysical properties to match the measurements with no clear way to adjust the uncertainties.

Data Fusion Modeling has potential value added by objectively combining information in the various data sets and quantifying the uncertainties. For example, reservoir measurements from test wells can be combined with drilling data to obtain petrophysical properties and simulation results that are statistically consistent with both drilling data and reservoir measurements. Improvement is obtained by combining information from the following sources: reservoir measurements on the oil and water, drilling data, and geostatistical relationships. Further, the uncertainties can be quantified in order to help determine the odds of profitable recovery.

Water Supply Development

Data Fusion Modeling (DFM) can be used to aid decision-making in water supply development. The objective is to deliver water to a private or municipal water system at a specified demand rate subject to constraints such as a regulatory drawdown constraint. The typical design decisions to be made are the number of wells, their location, and the pumping rates. Further, monitoring is required to ensure that regulatory constraints are met. DFM has potential value added by providing models that can be used to simulate different design alternatives in order to select the best. DFM can determine the models using information from the following sources: hydraulic data such as head and conductivity measurements, the physics of ground water flow, and models for hydraulic heterogeneities. DFM also has value added for monitoring by providing on-line model updates. Further, the ability of DFM to quantify uncertainty can be used to meet regulatory requirements within quantified safety margins.

Geotechnical Engineering Projects

Data Fusion Modeling (DFM) can be used to aid decision making for geotechnical engineering projects. Groundwater control is often important for the conduct of geotechnical projects. For example, the stability of excavated slopes must be maintained and excessive seepage into excavations must be avoided. Groundwater control is typically accomplished with dewatering wells and horizontal drains. Decisions are needed about the steepness of slopes, the number of wells and drains, their placement, and pumping rates. DFM has potential value added by providing predictive models that can be used to simulate different alternatives in order to select the best. The models are provided using information from the following sources: hydraulic data such as head and conductivity measurements, the physics of groundwater flow, and models for hydraulic heterogeneities. Since DFM quantifies uncertainty, decisions can be made with quantified safety margins.

Management Optimization

Data Fusion Modeling (DFM) can provide predictive models to aid decision making for environmental remediation, water supply development, geotechnical engineering projects, and oil reservoir management. The predictive models provide a way to simulate alternative designs with quantified statistical confidence. Since the confidence is quantified, decision analysis can be used to balance benefits, costs, and risk from uncertainties. Decision variables to be determined are typically numbers of wells, their placement, and pumping and injection rates. Numerical optimization can be used to systematically adjust the decision variables until the best tradeoff is achieved. The value added by this DFM approach is that decisions can be made taking into account risks from uncertainties.

Figure 9:
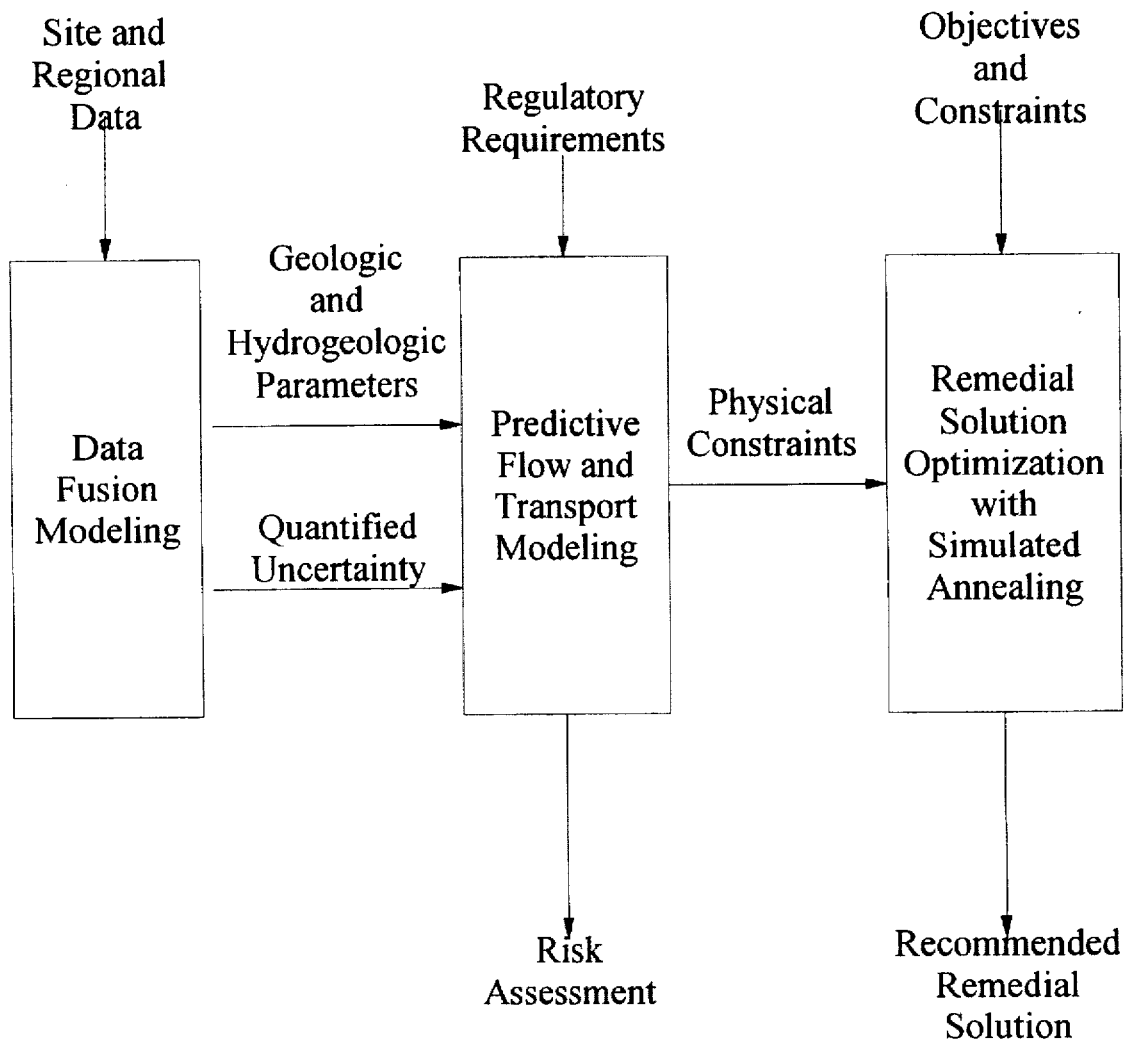
FIG. 9 shows a flow diagram illustrating Optimized Remediation using Data Fusion Modeling.

FIG. 9 illustrates an algorithm for optimizing a remediation process using Data Fusion Modeling. The estimated geologic and hydrogeologic parameters and uncertainty computed by Data Fusion Modeling (first block) are used to predict the contaminant concentration levels at specified locations (second block). These levels can be used to compute the risk to humans. The flow and transport models developed by the Data Fusion Modeling become a physical constraint in designing the remediation program. These models can then be used to design an optimal remediation strategy which minimizes total cost to acheive the given remediation objectives (third block).

A software code listing is attached hereto as a microfiche appendix. This code provides examples for implementing the invention as described above. The code may be executed on, e.g., a workstation-class computer such as the unix-based Indigo 2, Indy, and Onyx machines commercially available from Silicon Graphics Incorporated of Mountain View, Calif. Other examples of suitable hardware platforms include, e.g., Unix-, OS/2-, or Windows NT-based machines which utilize the Pentium series of processors available from Intel Corporation of Santa Clara, Calif. For most hydrological modeling with medium or fine grids, the machine preferably comprises 128 megabytes or more of random access memory and several gigabytes of hard disk storage. The man-machine interface is preferably based on any of several commercially available graphical user interface products, such as the Ingres 4GL product available from Computer Associates, of Alameda, Calif. Data visualization is preferably provided via any of several suitable commercially available data visualization packages, such as the Earth Vision software available from Dynamic Graphics, Inc. of Alameda, Calif., or Tecplot, available from Amtec Engineering of Bellevue, Wash. The TDEM, FDEM, and direct resistivity forward models preferably use any of several commercially available products, such as TEMIX, EMIX34, and RESIX from Interpex, Limited of Golden, Colo.

While the invention has been particularly shown and described with reference to preferred embodiments thereof, it will be understood by those skilled in the art that various changes in form and details may be made therein without departing from the spirit and scope of the invention.

The embodiments of the invention in which an exclusive property or privilege is claimed are defined as follows:

1. A data fusion workstation for creating a reconstruction of a site from measurement data and computerized models, comprising:
   means for storing measurement equations describing at least one physical characteristic of a site;
   means for storing pseudomeasurement equations describing said at least one physical characteristic;
   means for generating a site model comprising a computer reconstuction of said site;
   means for optimizing said site model, comprising:
      means for comparing data produced by said site model to data produced by said measurement equations and for generating a first quantification of error based upon differences therebetween;
      means for comparing data produced by said site model to data produced by said pseudomeasurement equations and for generating a second quantification of error based upon differences therebetween;
      means for calculating a least squares solution which reduces a cost function related to said first and second quantifications of error, said means for calculating comprising means for executing a trust region algorithm which limits Gauss-Newton steps;
      means for using said least squares solution to adjust said site model;
   means for displaying a graphical representation of said site model.

2. A data fusion workstation for creating a reconstruction of a site from measurement data and computerized models, comprising:
   means for storing measurement equations describing at least one physical characteristic of a site;
   means for storing pseudomeasurement equations describing said at least one physical characteristic;
   means for generating a site model comprising a computer reconstuction of said site;
   means for optimizing said site model, comprising:
      means for comparing data produced by said site model to data produced by said measurement equations and for generating a first quantification of error based upon differences therebetween;
      means for comparing data produced by said site model to data produced by said pseudomeasurement equations and for generating a second quantification of error based upon differences therebetween;
      means for calculating a least squares solution which reduces a cost function related to said first and second quantifications of error, said means for calculating comprising means for executing a step-halving algorithm which limits Gauss-Newton steps;

means for using said least squares solution to adjust said site model;

means for displaying a graphical representation of said site model.

3. A data fusion workstation for creating a reconstruction of a site from measurement data and computerized models, comprising:

means for storing measurement equations describing at least one physical characteristic of a site;

means for storing pseudomeasurement equations describing said at least one physical characteristic;

means for generating a site model comprising a computer reconstuction of said site;

means for optimizing said site model, comprising:

means for comparing data produced by said site model to data produced by said measurement equations and for generating a first quantification of error based upon differences therebetween;

means for comparing data produced by said site model to data produced by said pseudomeasurement equations and for generating a second quantification of error based upon differences therebetween;

means for calculating a least squares solution which reduces a cost function related to said first and second quantifications of error, said means for calculating comprising an iterative linear least squares solver for calculating Gauss-Newton steps;

means for using said least squares solution to adjust said site model;

means for displaying a graphical representation of said site model.

4. A data fusion workstation for creating a reconstruction of a site from measurement data and computerized models, comprising:

means for storing a spatial continuity model;

means for receiving user input of a covariance function;

means for computing spatial continuity AR coefficients from said covariance function;

means for using said spatial continuity AR coefficients in a spatial continuity model;

means for using said spatial continuity model to create a site model;

means for displaying a graphical representation of said site model.

5. A data fusion workstation for creating a steady-state hydrological flow model, comprising:

means for storing measurement equations describing at least one physical characteristic of a site;

means for storing pseudomeasurement equations describing said at least one physical characteristic;

means for generating a hydrological flow model comprising a computer reconstuction of said site;

means for optimizing said site model, comprising:

means for comparing data produced by said site model to data produced by said measurement equations and for generating a first quantification of error based upon differences therebetween;

means for comparing data produced by said site model to data produced by said pseudomeasurement equations and for generating a second quantification of error based upon differences therebetween;

means for calculating a least squares solution which reduces a cost function related to said first and second quantifications of error;

means for using said least squares solution to adjust said hydrological flow model;

means for displaying a graphical representation of said hydrological flow model.

6. A data fusion workstation for creating a site model which includes information on groundwater flow, comprising:

means for storing measurement equations describing at least one physical characteristic of a site;

means for storing pseudomeasurement equations describing said at least one physical characteristic;

means for generating a site model comprising a computer reconstuction of said site and a quantification of uncertainty on groundwater flow;

means for optimizing said site model, comprising:

means for comparing data produced by said site model to data produced by said measurement equations and for generating a first quantification of error based upon differences therebetween;

means for comparing data produced by said site model to data produced by said pseudomeasurement equations and for generating a second quantification of error based upon differences therebetween;

means for calculating a least squares solution which reduces a cost function related to said first and second quantifications of error;

means for using said least squares solution to adjust said site model;

means for displaying a graphical representation of said site model.

7. A data fusion workstation for creating a site model which includes information on oil reservoir properties, comprising:

means for storing measurement equations describing at least one physical characteristic of a reservoir site;

means for storing pseudomeasurement equations describing said at least one physical characteristic;

means for generating a site model comprising a computer reconstuction of said site and a quantification of uncertainty associated with said reconstruction;

means for optimizing said site model, comprising:

means for comparing data produced by said site model to data produced by said measurement equations and for generating a first quantification of error based upon differences therebetween;

means for comparing data produced by said site model to data produced by said pseudomeasurement equations and for generating a second quantification of error based upon differences therebetween;

means for calculating a least squares solution which reduces a cost function related to said first and second quantifications of error;

means for using said least squares solution to adjust said reservoir site model;

means for displaying a graphical representation of said reservoir site model.

* * * * *